(12) United States Patent
Thomas et al.

(10) Patent No.: US 7,635,156 B2
(45) Date of Patent: Dec. 22, 2009

(54) MODULAR VEHICLE INTERIOR SYSTEM

(75) Inventors: Freeman Thomas, Laguna Beach, CA (US); Kris Tomasson, Corona del Mar, CA (US); David Woodhouse, Newport Coast, CA (US); Jordan Bennett, Ann Arbor, MI (US); Matthew Edwards, Laguna Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 11/620,471

(22) Filed: Jan. 5, 2007

(65) Prior Publication Data

US 2008/0164725 A1 Jul. 10, 2008

(51) Int. Cl.
*B60J 7/00* (2006.01)
(52) U.S. Cl. .................... 296/193.03; 296/193.04; 296/39.1; 296/63
(58) Field of Classification Search ............ 296/26.08, 296/26.09, 26.1, 26.11, 24.42, 24.3, 24.31, 296/24.36, 24.39, 193.04, 193.03, 182.1, 296/39.1, 63, 64, 65.03
See application file for complete search history.

(56) References Cited

U.S. PATENT DOCUMENTS

| | | | | |
|---|---|---|---|---|
| 3,719,244 A | * | 3/1973 | Miller et al. | 180/14.1 |
| 5,064,335 A | * | 11/1991 | Bergeron et al. | 414/522 |
| 6,971,699 B2 | | 12/2005 | Isaacson | |

\* cited by examiner

*Primary Examiner*—Joseph D Pape
(74) *Attorney, Agent, or Firm*—Frank A. MacKenzie; Brooks Kushman P.C.

(57) ABSTRACT

A vehicle is disclosed having a vehicle body and a module. The vehicle body has a front end and a rear end with an opening formed through the rear end. The module is sized to be received within the rear end opening. The module has at least a portion of a vehicle interior mounted therein. The module is adapted to be inserted into the opening of the rear end to cooperate with the vehicle body to form the at least a portion of the vehicle interior. A modular vehicle interior system is disclosed with a module which is sized to be received within a rear end opening of a vehicle body. A method for assembling a vehicle interior is also disclosed.

14 Claims, 3 Drawing Sheets

MODULAR VEHICLE INTERIOR SYSTEM

BACKGROUND OF THE INVENTION

1. Field of the Invention

Various embodiments of the present invention relate to a modular interior system for a vehicle.

2. Background Art

A vehicle generally has an interior which is mounted within a vehicle body. The interior typically has multiple components which are installed within the body to complete the interior. These components may include: flooring material, vehicle seats, roofing material, paneling, seat belts, lighting, and other components which may be incorporated into the interior.

Assembling the interior is a process which is often completed in multiple, sequential operations. First, flooring material is conventionally installed into the vehicle body. Pieces of carpet are often used as flooring material and are separately fastened into the vehicle body. The process is time-consuming and expensive when assembling the vehicle. The process often requires multiple workers to try to increase production speed.

Next, seats are typically installed or mounted within the vehicle body. Each seat is separately fastened within the vehicle body at multiple fastener locations. Such installation requires additional time, additional cost, and multiple workers.

Roofing material is typically installed into the vehicle body. Pieces of the roofing material are independently placed and mounted within the vehicle body. Installing the roofing material is another step which increases the time and cost required to produce a vehicle.

Paneling, instrumentation, seat belts, lighting, and other components also are conventionally installed within the vehicle interior. Each panel, instrument, seat belt, and light must be separately placed and fastened within the vehicle body. Again, these installations require additional time, additional cost, and multiple workers. If a single component is improperly installed, there is a potential for delays in the installation process which increase the time to assemble the vehicle and the overall cost to build the vehicle.

SUMMARY OF THE INVENTION

In one embodiment, a vehicle is provided with a vehicle body and a module. The vehicle body has a front end and a rear end with an opening formed through the rear end. The module is sized to be received within the rear end opening. The module has at least a portion of a vehicle interior mounted therein. The module is adapted to be inserted into the opening of the rear end to cooperate with the vehicle body to form the at least a portion of the vehicle interior.

In another embodiment, a modular vehicle interior system is provided with a module. The module is sized to be received within a rear end opening of a vehicle body. The module has at least a portion of a vehicle interior mounted therein. The module is adapted to be inserted into the opening of the rear end to cooperate with the vehicle body to form the at least a portion of the vehicle interior.

In yet another embodiment, a method for assembling a vehicle interior is provided. The method requires providing a vehicle body, selecting one of a plurality of modules having various interior arrangements, and mounting the one of a plurality of modules within the vehicle body.

The above embodiments, and other embodiments, objects, features, and advantages of the present invention are readily apparent from the following detailed description of embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
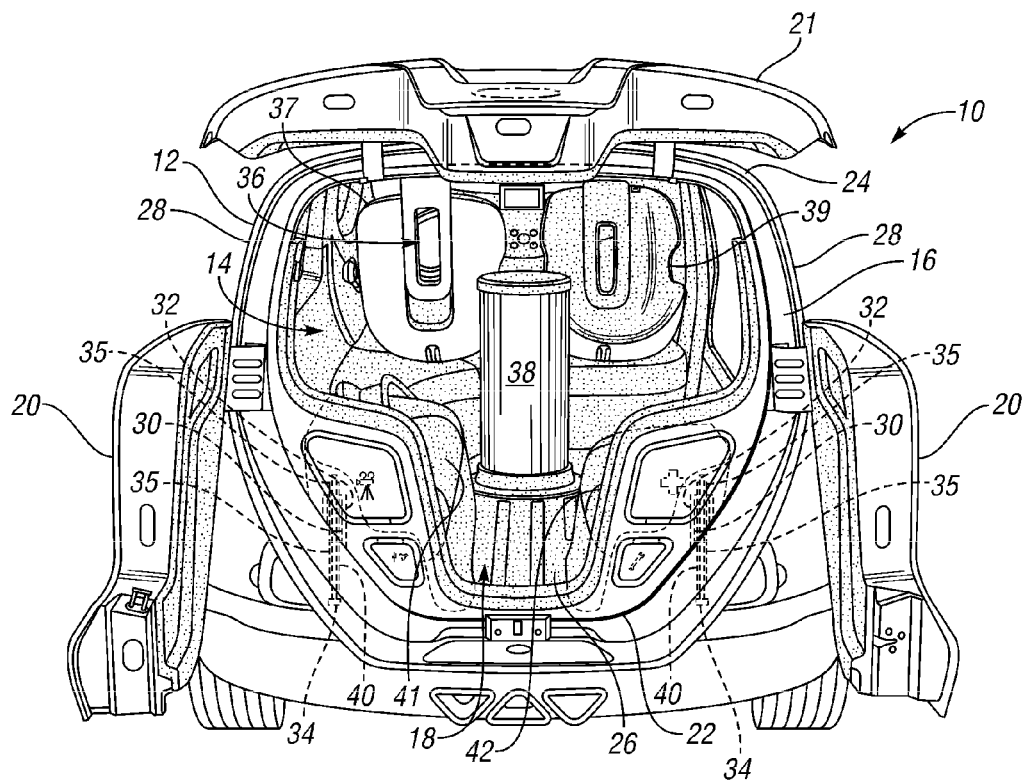
FIG. 1 is a rear elevation view of a vehicle with a modular interior system fully assembled.

Referring to FIG. 1, a passenger vehicle is illustrated and referenced generally by numeral 10. The passenger vehicle 10 has a vehicle body 12, which provides a body structure for the vehicle 10.

The vehicle body 12 defines an interior 14 for housing passengers and cargo within the vehicle. The vehicle body 12 also defines an exterior portion of the vehicle body 12 which has a rear end 16 toward the rearward direction of travel of the vehicle 10. Any size or shape for the rear end 16 is contemplated within the scope of the present invention. The rear end 16 has an opening 18 formed through the vehicle body 12. The opening 18 allows passenger ingress and egress to and from the interior 14 and allows a passenger to load or unload cargo to or from the interior 14.

In the embodiment depicted, the exterior portion of the vehicle body 12 has rear barnyard doors 20 and a liftgate 21 mounted to the vehicle body 12 to collectively enclose the opening 18 when in a closed position. Although rear barnyard doors 20 and a liftgate 21 are illustrated, any suitable amount and orientation for the rear doors 20 is contemplated within the scope of the present invention to enclose the opening 18.

A module 22 may be inserted into the opening 18 to form a part of the vehicle interior 14. The module 22 fits through the opening 18 and is bounded on a top side by a roof region 24, a bottom side by a floor region 26, and on opposing sides by a opposing lateral sides 28 of the vehicle body 12. The module 22 is a translatable modular unit and akin to a cassette.

To install the module 22 within the vehicle body 12, in one embodiment, the vehicle body 12 has a track 30 to facilitate translation along the track 30 by the module 22 as the module 22 is inserted into the vehicle body 12. The track 30 may be mounted to the vehicle body 12 using adhesives or fasteners. In another embodiment, the track 30 is formed as an integral part of the vehicle body 12.

In the depicted embodiment, the track 30 is oriented between the rear end 16 of the vehicle body 12 and an opposing end of the vehicle body 12. In one embodiment, the track 30 spans the general distance from the rear end 16 to the opposing end of the vehicle body 12. In another embodiment, the track 30 spans a portion of the distance from the rear end 16 to the opposing end of the vehicle body 12.

The track 30 may be mounted or formed anywhere on the roof region 24, the floor region 26, or the lateral side 28 of the vehicle body 12 so that the track 30 spans at least part of the distance between the rear end 16 and the opposing end of the vehicle body 12. The track 30 may be located near the middle of the roof region 24, the floor region 26, or the lateral side 28 to provide stability for the module 22 during installation.

In the embodiment illustrated, a second track 30 is located on the floor region 26. The first and second tracks 30 are located on the floor region 26 near opposing lateral sides 28 to provide stability for the module 22 during installation. In another embodiment, the first and second tracks 30 are located on the roof region 24 and the floor region 26 or opposing lateral sides 28 of the vehicle body 12 or a combination thereof. Additional tracks 30 may be located on the vehicle body 12.

The module 22 is depicted with a guide 32 corresponding to the track 30 to further facilitate insertion of the module 22 into the vehicle body 22. Any type of guide 32 which may cooperate with the track 30 is contemplated within the scope of the present invention. The guide 32 may be mounted or formed anywhere in or on the module 22 to correspond with the track 30. As illustrated, a second guide 32 may be located on the module 22. Additional guides 30 may be located on the module 22 and may exceed the number of tracks 30 so that the module 22 can be utilized in multiple vehicle bodies 12 having differing placement and/or amounts of tracks 30.

In one embodiment, the track 30 and guide 32 are smooth to facilitate installation of the module 22. In another embodiment, grease is dispensed in the track 30 to lubricate the sliding of the track 30 and the guide 32 for easier installation of the module 22.

To secure the module 22 in place after installation into the vehicle body 12, fasteners 34 may be inserted through a portion of the vehicle body 12 and the module 12. In the embodiment illustrated, the fasteners 34 are mounted through the vehicle body 12, the tracks 30, the guides 32, and the module 22. In another embodiment, the fasteners 34 are bolts cooperating with nuts. Any suitable fastener 34 to adequately hold the module 22 to the vehicle body 12 may be utilized.

Figure 2:
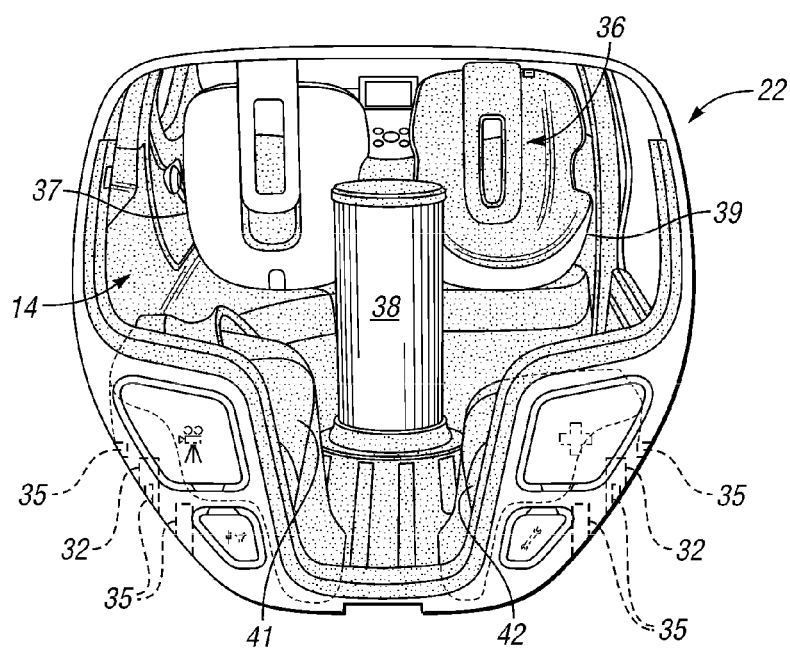
FIG. 2 is a rear elevation view of the module of FIG. 1.

Referring now to FIG. 2, the module 22 is illustrated prior to installation into the vehicle body of FIG. 1. The module 22 forms a portion of the vehicle interior 14 in the embodiment illustrated. In another embodiment, multiple modules 22 are provided to form the entire vehicle interior. In yet another embodiment, one module 22 forms the entire vehicle interior 14.

As illustrated, the module 22 has a first row of seating 36 with a first seat 37 and a second seat 39 mounted in the module 22. In the illustrated embodiment, the first seat 37 is facing toward a front end of the vehicle 10 while the second seat 39 faces toward a rear end of the vehicle. A second row of seating 41 and a third row of seating 42 are also illustrated as bench seats 41, 42. Although three rows of seating are illustrated, any suitable amount of seating rows for transporting passengers is contemplated within the scope of 10 the present invention. In another embodiment, the interior 14 has a cargo storage area for storing cargo.

The module 22 may have any desired component therein, such as roofing material, flooring material, a light source, a television 38 or seat belts. The components are assembled within the module 22 before the module is installed into the vehicle. By installing the components into the module 22 before the module 22 is installed into the vehicle body 12, the time required to assemble the vehicle on a vehicle assembly line is decreased, thereby increasing throughput.

In one embodiment, the modules 22 are assembled using a just-in-time manufacturing system so that only the required modules 22 are supplied to build the vehicle. In another embodiment, multiple designs are produced for modules 22 which fit inside the same vehicle body 12 to increase the number of available interior designs for one vehicle. In yet another embodiment, multiple modules 22 fit into vehicle bodies 12 of various vehicles, producing savings through economy of scale.

As illustrated, the module 22 has fastener apertures 35 formed through the module 22 to receive fasteners to secure the module 22 into a vehicle body. In one embodiment, the fastener apertures 35 are provided through a portion of the seats 41, 42 so that fasteners 34 extend through fastener apertures 40 in the vehicle 10 into the fastener apertures 35 in the module 22 and into a portion of the seats 41, 42, as depicted in FIG. 1. In at least one embodiment, the fastener apertures 35 are provided through the guides 32 and a part of the outside surface of the module 22. The fastener apertures 35 may be located anywhere on the module 22.

Figure 3:
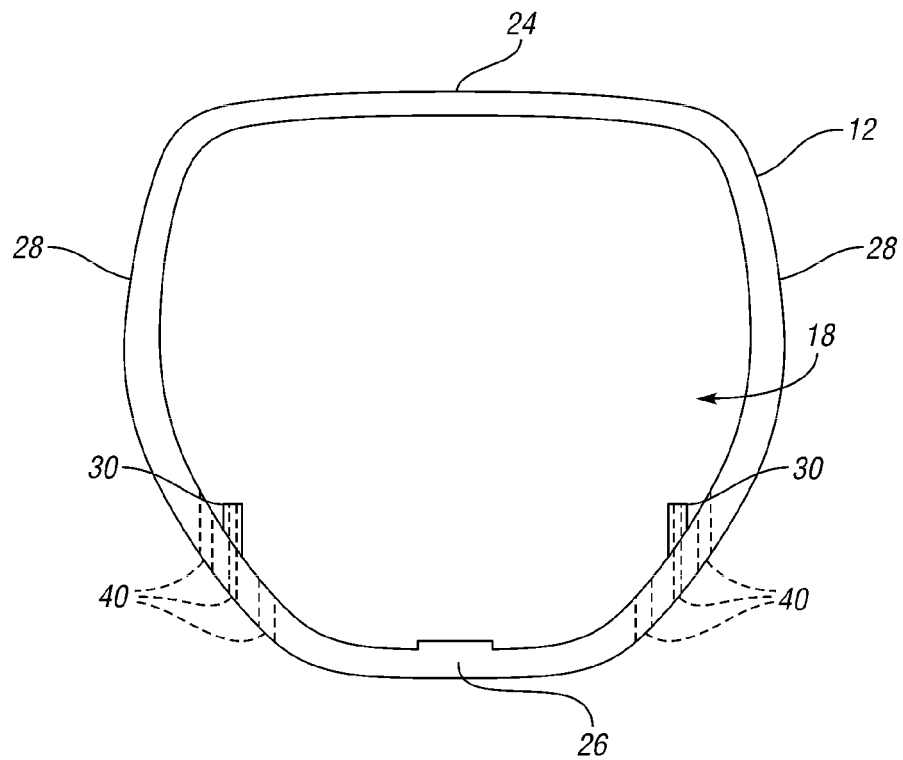
FIG. 3 is a rear elevation view of the vehicle body of FIG. 1.
Figure 4:
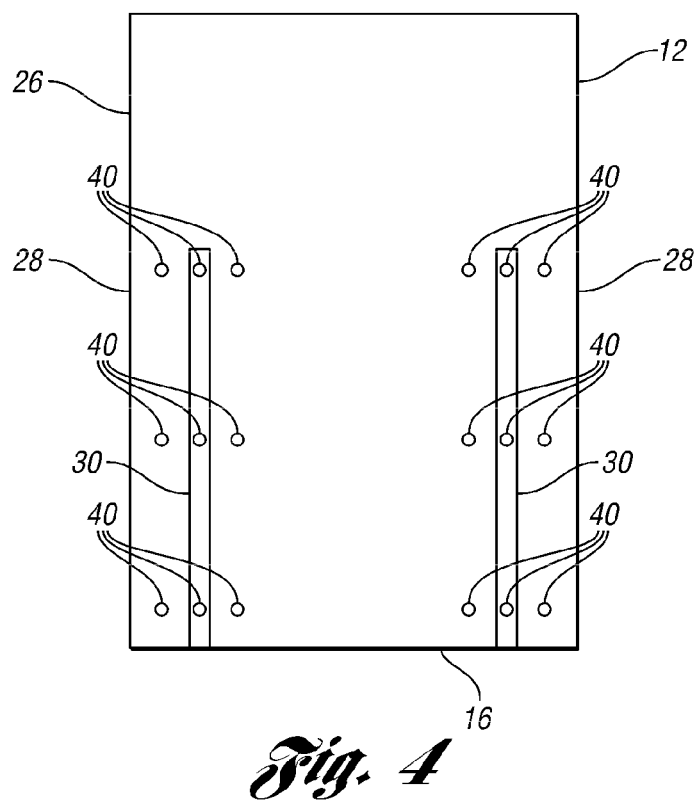
FIG. 4 is a top plan view of a vehicle floor region of the vehicle body of FIG. 3.

Referring now to FIGS. 3 and 4, the vehicle body 12 is illustrated before a module of FIG. 1 has been installed therein. The vehicle body 12 has fastener apertures 40 formed through the vehicle body 12. The fastener apertures 40 may be formed through the tracks 30 mounted on the vehicle body 12. The fastener apertures 40 may correspond with fastener apertures formed through a module inserted into the vehicle body 12 through the opening 18. The fastener apertures 40 may be sized to receive fasteners therein to hold the module to the vehicle body 12 after installation.

As illustrated in FIG. 4, the tracks 30 may partially span from a first end 16 toward the opposite end of the vehicle body 12 along the floor region 26. In another embodiment, the tracks 30 span the general distance from the first end 16 to the opposite end of the vehicle body 12.

Figure 5:
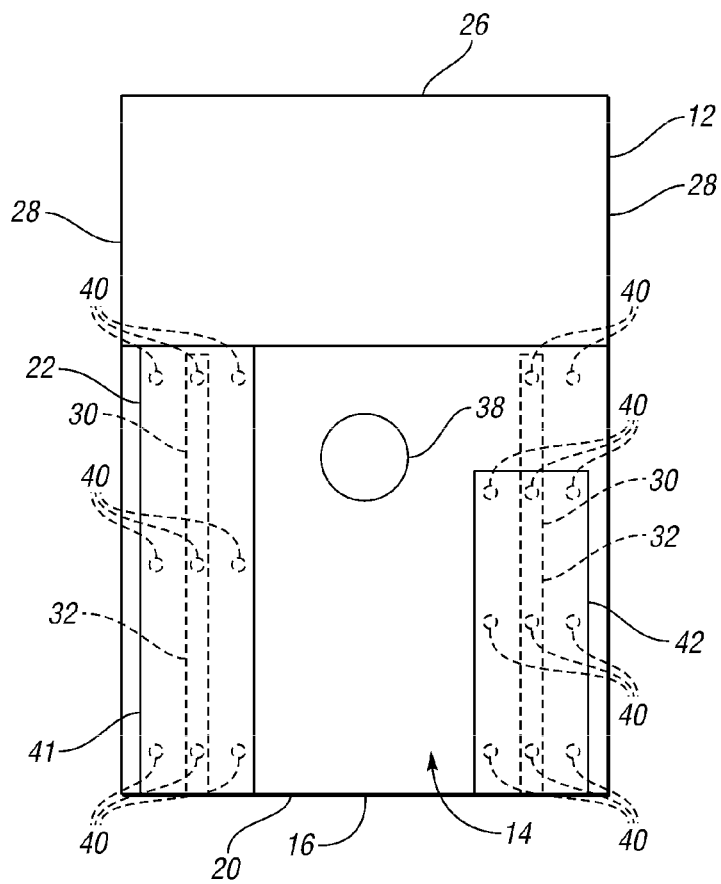
FIG. 5 is a top plan view of the vehicle floor region and interior module of FIG. 1.

With reference to FIG. 5, the vehicle body 12 is illustrated with the module 22 installed into the vehicle body 12. The module 22 has slid along the tracks 30, aided by the guides 32, to the installed position illustrated. The fastener apertures 40 of the vehicle body 12 and the module 22 are aligned so that fasteners may be mounted through the fastener apertures 40 to secure the module 22 to the vehicle body 12.

Figure 6:
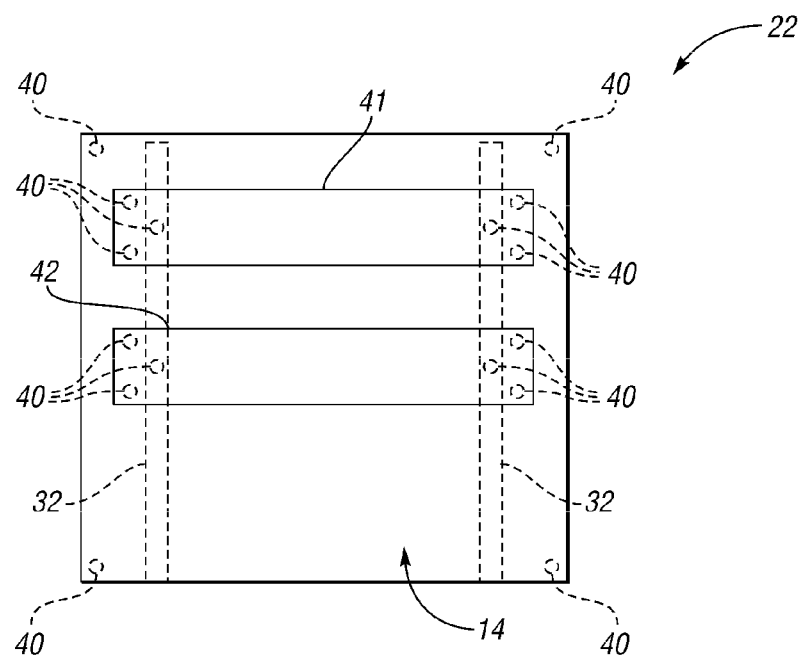
FIG. 6 is a top plan view of another embodiment of an interior module.

Referring to FIG. 6, another embodiment of the module 22 of FIG. 1 is illustrated. The module 22 has two benches 41, 42 mounted therein. The benches 41, 42 are sized to support multiple passengers thereon. Fastener apertures 40 may be provided through a portion of the benches 36 to aid in mounting the module 22 to a vehicle body.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle comprising:
   a vehicle body having a front end and a rear end with an opening formed through the rear end; and
   a module sized to be received within the rear end opening, the module forming at least a portion of an interior;

wherein the module is adapted to be inserted into the opening of the rear end to cooperate with the vehicle body to form the at least a portion of a vehicle interior;

wherein the module further comprises at least one seat for seating a passenger thereon; and further comprising at least one fastener provided through the vehicle body, the module, and a portion of the at least one seat to secure the module to the vehicle body.

2. The vehicle of claim 1 wherein the module is interchangeable with at least a second module which is adapted to be selectively inserted into the opening of the rear end.

3. The vehicle of claim 1 wherein the at least one seat is further defined as a bench to support a plurality of passengers.

4. The vehicle of claim 1 wherein the at least one seat is further defined as a plurality of benches to support a plurality of passengers.

5. The vehicle of claim 1 further comprising at least one track provided on the vehicle body extending from the rear end opening toward the front end, the at least one track communicating with at least one guide provided on an outer surface of the module to facilitate insertion of the module into the opening of the rear end to an assembled orientation.

6. The vehicle of claim 5 further comprising a first track and a second track provided on the vehicle body a distance apart, the first and second tracks communicating respectively with first and second guides provided on the outer surface of the module.

7. The vehicle of claim 6 wherein the first track and second track are provided proximate a floor portion of the module.

8. The vehicle of claim 7 wherein the first track and second track are provided proximate opposing lateral sides of the vehicle body.

9. A modular vehicle interior system comprising:

a module sized to be received within a rear end opening of a vehicle body, the module forming at least a portion of an interior;

wherein the module is adapted to be inserted into the opening of the rear end to cooperate with the vehicle body to form the at least a portion of a vehicle interior;

wherein the module further comprises at least one seat for seating a passenger thereon; and further comprising at least one fastener provided through the vehicle body, the module, and a portion of the at least one seat to secure the module to the vehicle body.

10. The modular interior system of claim 9 wherein the module is interchangeable with at least a second module which is adapted to be selectively inserted into the opening of the rear end.

11. The modular interior system of claim 10 further comprising at least one track provided on the vehicle body extending from the rear end opening toward the front end, the at least one track communicating with at least one guide provided on an outer surface of the module to facilitate inserting the module into the opening of the rear end to an assembled orientation.

12. The modular interior system of claim 11 further comprising a first track and a second track provided on the vehicle body a distance apart, the first and second tracks communicating respectively with first and second guides provided on the outer surface of the module.

13. The modular interior system of claim 12 wherein the first track and second track are provided proximate a floor portion of the module.

14. The modular interior system of claim 13 wherein the first track and second track are provided proximate opposing lateral sides of the vehicle body.

* * * * *